US007171688B2

(12) United States Patent
Boom

(10) Patent No.: US 7,171,688 B2
(45) Date of Patent: Jan. 30, 2007

(54) SYSTEM, METHOD AND COMPUTER PROGRAM FOR THE DETECTION AND RESTRICTION OF THE NETWORK ACTIVITY OF DENIAL OF SERVICE ATTACK SOFTWARE

(75) Inventor: Douglas D. Boom, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 837 days.

(21) Appl. No.: 09/886,975

(22) Filed: Jun. 25, 2001

(65) Prior Publication Data

US 2002/0199109 A1 Dec. 26, 2002

(51) Int. Cl.
*H04L 9/00* (2006.01)
(52) U.S. Cl. .......................................... 726/22; 726/13
(58) Field of Classification Search ................ 713/188, 713/182, 154, 152, 187; 370/229, 231, 232, 370/230.1, 230; 709/223, 224, 225; 726/13, 726/22
See application file for complete search history.

(56) References Cited

U.S. PATENT DOCUMENTS

| 6,321,338 | B1 * | 11/2001 | Porras et al. ............... 713/201 |
| 6,519,703 | B1 * | 2/2003 | Joyce ......................... 713/201 |
| 6,725,378 | B1 * | 4/2004 | Schuba et al. .............. 713/201 |

OTHER PUBLICATIONS

Scambray et al. "Hacking Exposed", Oct. 18, 2000, 2nd Edition, pp. 499-501.*

* cited by examiner

*Primary Examiner*—Gilberto Barron, Jr.
*Assistant Examiner*—Thomas Ho
(74) *Attorney, Agent, or Firm*—Crystal D. Sayles

(57) ABSTRACT

A system, method and computer program for detecting and restricting remotely controlled distributed denial of service software. This detection is based upon characteristic patterns seen in denial of service software. These patterns are monitored for at the generating source of the attack. When detected, the software application attempting a distributed denial of service is blocked from transmitting any packets to a target web server. Therefore, this system, method a computer program stops distributed denial of service attacks before a web site can be overwhelmed by such an attack.

31 Claims, 9 Drawing Sheets

SYSTEM, METHOD AND COMPUTER PROGRAM FOR THE DETECTION AND RESTRICTION OF THE NETWORK ACTIVITY OF DENIAL OF SERVICE ATTACK SOFTWARE

FIELD

The invention relates to a system, method and computer program for the detection and restriction of the network activity of denial of service attack software. More particularly, the present invention monitors packets being transmitted by a computer over a network and is able to identify when these packets are part of a distributed denial of service (DDoS) attack and is able to stop the transmission of these packets before they enter the network.

BACKGROUND

With the explosion in Internet 40, as shown in FIG. 1 access and usage individuals have discovered and become dependent upon the availability of large amounts of information as well and the ability to buy and sell goods and services. As shown in FIG. 1, a typical Internet user would have a browser installed in his personal computer (PC) 10 or server 20 such as Internet Explorer™ or Netscape™. Using this browser, the user would access an Internet service provider, such as America-On-Line (AOL™) (not shown), via a modem over the local public switched telephone network (PSTN), a cable network or satellite link. Once logged onto an Internet web server (web server) 30, the user may utilize one of the many search engines, such as Yahoo™ or Lycos™, to specify search terms. The user could also log onto a web server 30 and view the products or services available for sale or receive the information desired.

FIG. 2 illustrates the software and hardware involved for communications between a server 20 and a web server 30. Sewer 20 would contain application software 200, such as, but not limited to, a browser, communicating to a network protocol 210, such as, but not limited to, TCP/IP (Transmission Control Protocol/Internet Protocol) or UDP (User Datagram Protocol), which in turn would communicate to a network interface 220. The network interface 220 may be, but is not limited to, any type of serial or parallel modem. The network interface 220 would communicate to the network/Internet 40 which in turn would interface to web server 30. Again, within web server 30, a network interface 230, such as a serial or parallel modem, would communicate to the network protocol 240, such as, but not limited to, TCP/IP or UDP. Thereafter, communications would be established with an application 250 which may be a search engine or any other type of web application.

However, the Internet 40 has proven to be prone to "hackers" which develop software that infiltrates computers connected to the Internet 40 or software that enables distributed denial of service (DDoS) attacks on web servers 30. The most common form of the DDoS attack is the flood attack, using many remotely controlled software applications also known as Zombie Applications (Zombies) 300, as shown in FIG. 3. Zombie applications 300 look and act to server 20 like any other software application 200, process, or macro. Therefore, most users would not recognize the presence of a zombie 300 embedded in their server 20 or personal computer (PC) 10. Often the zombie applications 300 would enter a server 20 or PC 10 via email. The server 20, PC 10 or web server 30 may also be corrupted with a zombie 300 by some method such as via a false program, called a Trojan Horse, or a virus obtained via file sharing.

During the most recent widely published DDoS attacks, there were estimates of thousands of zombies 300 all sending small packets to a web server 30. Unable to tell the real traffic from the DDoS attack, the web server 30 collapses under all the traffic. Virus scanners have proven ineffective in stopping DDoS attacks since the Virus scanners can only fix the trouble after the characteristic signature of a zombie 300 is known.

Still referring to FIG. 3, once a "hacker" has embedded the zombie 300 in the servers 20 all that is needed to initiate the DDoS attack is a denial of service initiator 310. This denial of service initiator 310 may be a message from the "hacker" or a specific time of day. It should be noted that FIG. 3 is identical to FIG. 2 wit the exception of the zombie 300 and the denial of service initiator 310. This allows a large and important web server to be easily disabled from use, costing, in many cases, millions of dollars in lost revenue.

Therefore, a system, method, and computer program is needed that will detect the presence of zombie applications and block them from launching a massive number of packets for delivery to a web server. This system, method, and computer program must detect and block the zombie packets before they can cause any denial of service to a web server. Further, this system, method, and computer program must be compatible with existing communications protocols involved in packet switched networks. Further, the system, method, and computer program must be easy to install and not interfere with normal packer transmission and reception.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
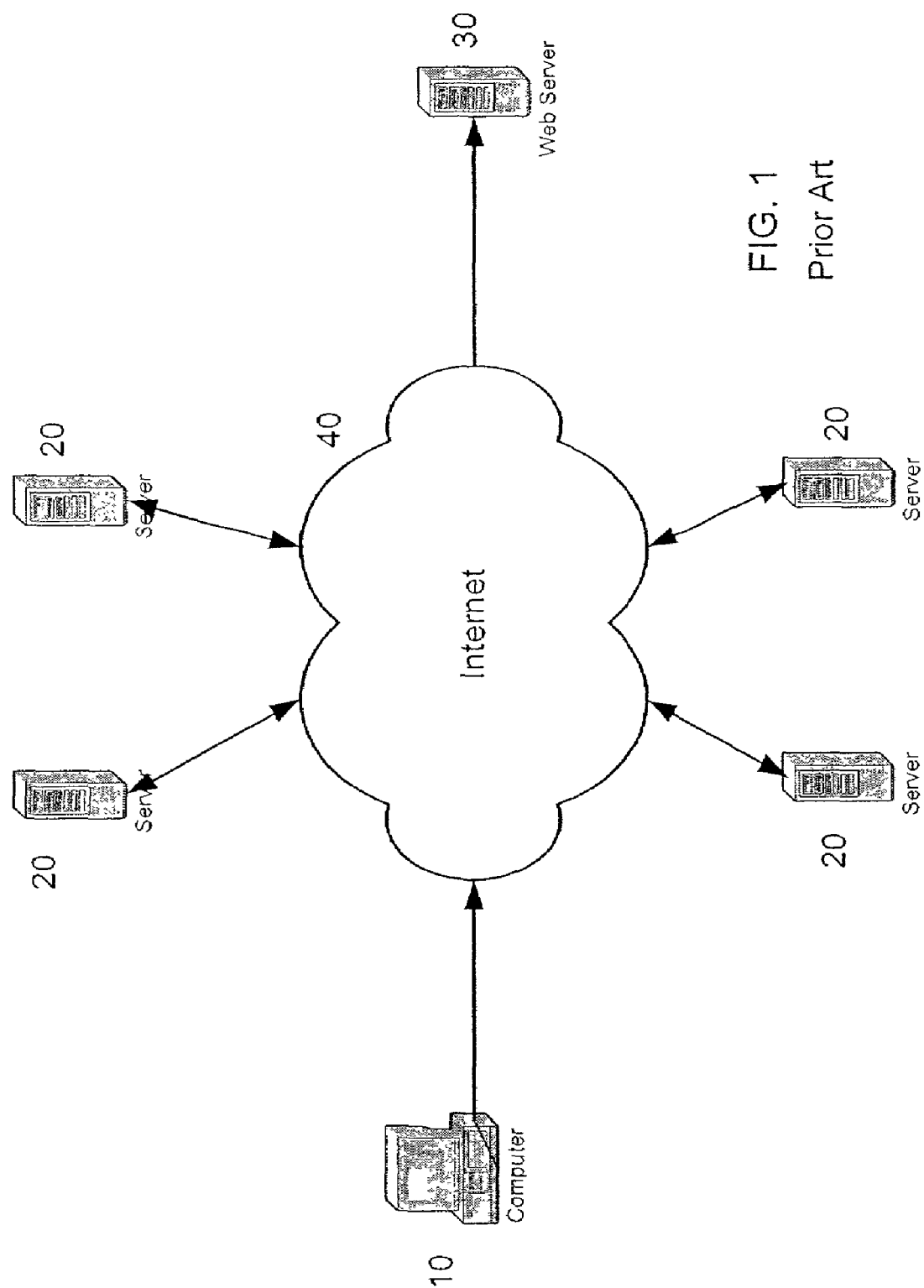
FIG. 1 is a systems diagram of a packet switched network.
Figure 2:
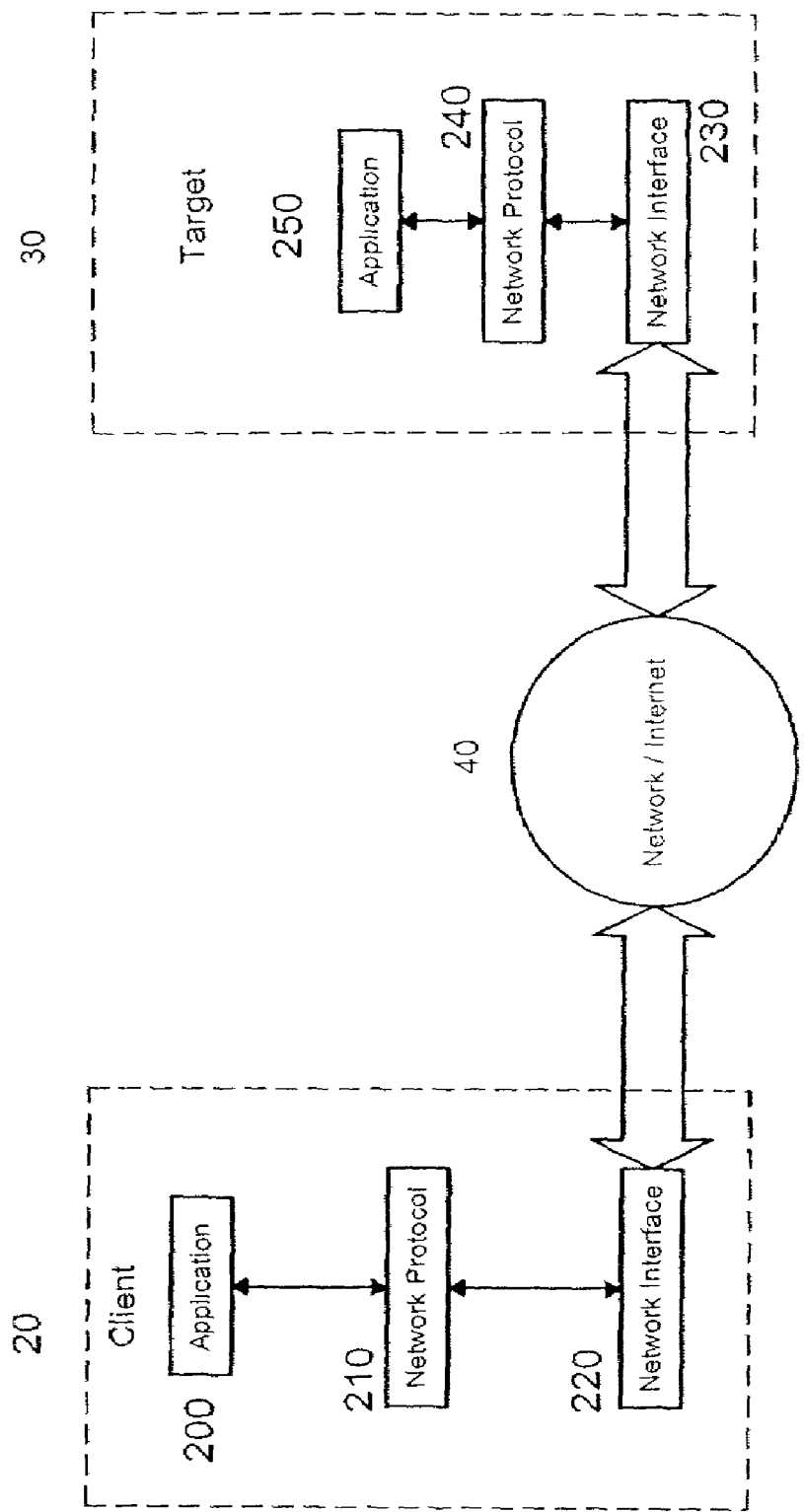
FIG. 2 is a block diagram of the software and hardware modules utilized in the packet switched network illustrated in FIG. 1.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same. As a final note, well-known components of computer networks may not be shown within the FIGs. for simplicity of illustration and discussion, and so as not to obscure the invention.

Figure 3:
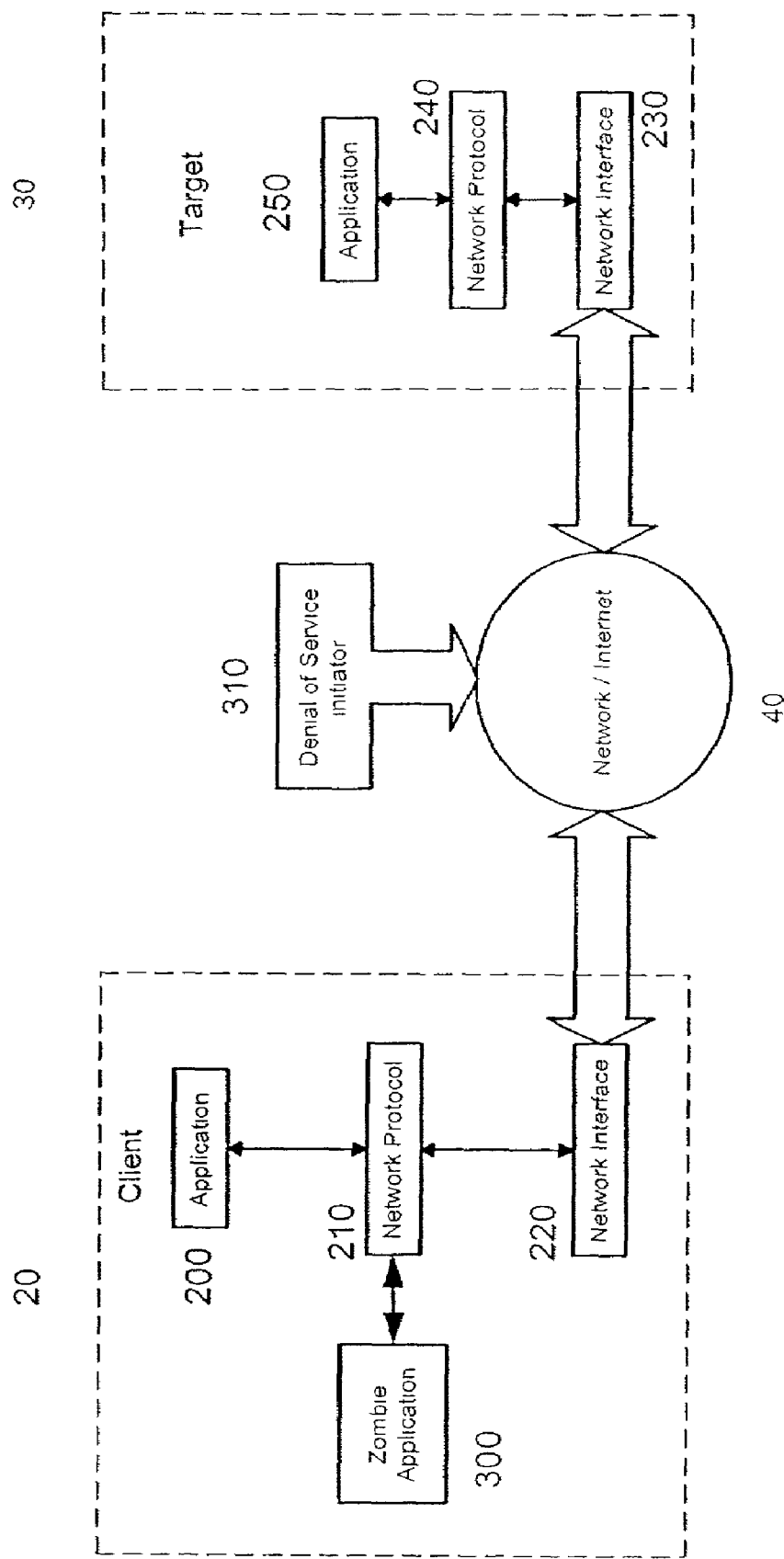
FIG. 3 is a block diagram illustrating the infiltration of a zombie application 300 within a server 20 and the activation of zombies 300 using a denial of service initiator 310.
Figure 4:
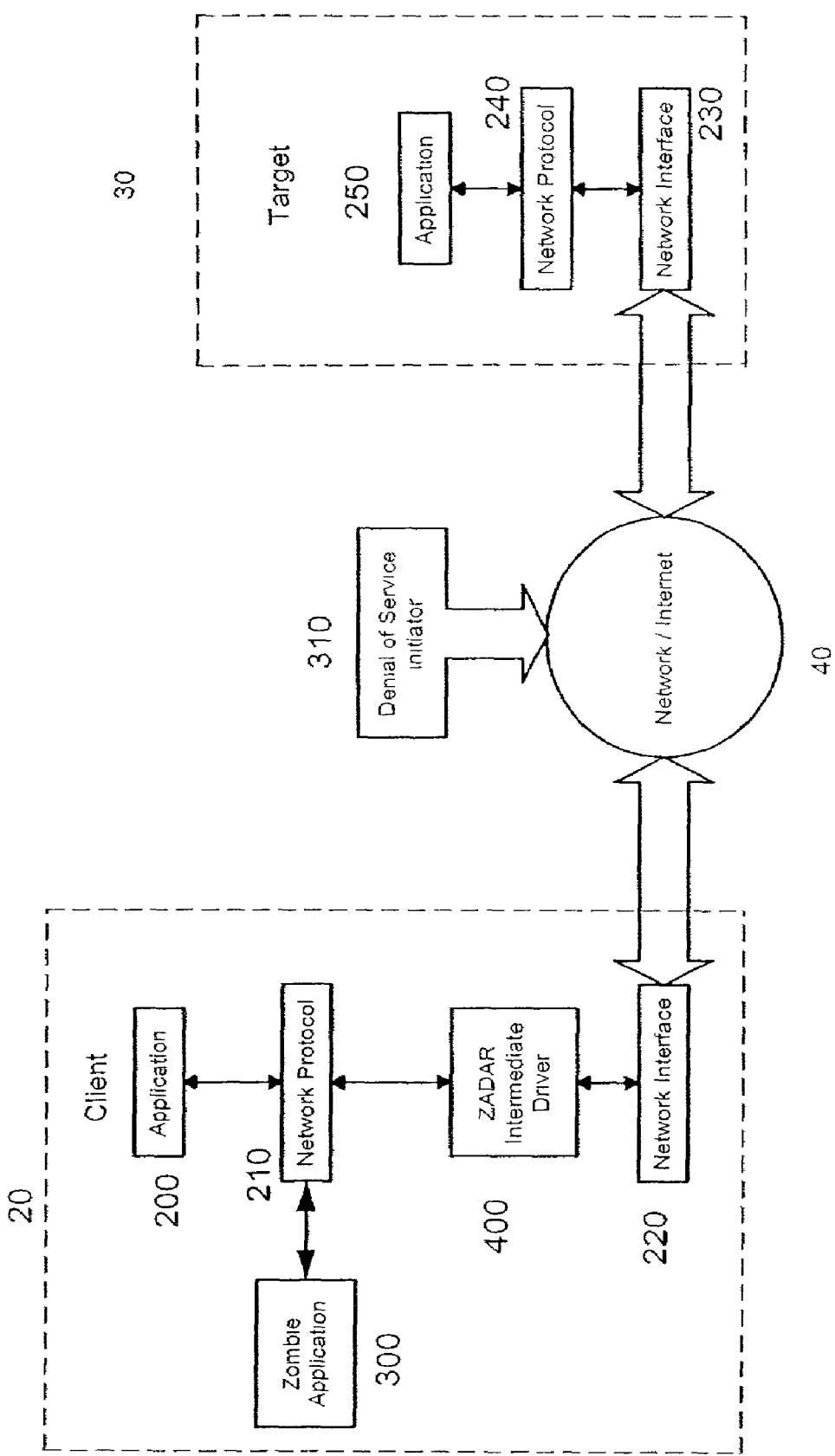
FIG. 4 is a block diagram of an example embodiment of the present invention which detects and restricts the transfer of packets by a zombie 300 in a DDoS attack utilizing a ZADAR (Zombie Activity Detection Alerting and Restriction system) intermediate driver 400.

FIG. 4 is a block diagram of an example embodiment of the present invention which detects and restricts the transfer of packets by a zombie 300 in a DDoS attack utilizing a ZADAR (Zombie Activity Detection Alerting and Restriction system) intermediate driver 400. Otherwise FIG. 4 is identical to FIG. 3, with the exception of the ZADAR intermediate driver 400 and only this difference with be discussed in reference to FIG. 4.

Still referring to FIG. 4, zombies 300 in their most basic form are user inaccessible applications, process or macros that register for network access with the network protocol 210 like any other application 200. The denial of service initiator 310 has a list of servers 20, PCs 10 and web servers 30 that have the Zombie 300 software installed. The denial of service initiator collects this list by sending out requests to the servers 20, PCs 10 and web servers 30 to which only the zombie 300 application knows the proper response. To start a DDoS attack, the denial of service initiator 310 sends the target information (web server 30 to be attacked) and the start sequence of the list of corrupted servers 20, PCs 10 and web servers 30. At this time traffic at the target web server 30 is normal. Once the zombie 300 application has verified the start sequence and processed the delay usually required for a uniform start, it begins sending small requests to the network protocol 210, with the target web server 30 as the end destination. To the network protocol 210, this appears normal and it only serves to translate application 200 requests into network traffic. The Network Interface 220 then does as instructed by the network protocol 210 and places all the packets on the network/Internet 40. At the target web server 30, the Network interface 230 suddenly sees a massive increase in traffic. The network protocol 240 is seeing so many requests that the infrastructure and resources of the target web server 30 become completely consumed. Since the flood of requests is timed to all arrive at approximately at the same time, the web server 30 cannot tell what is a legitimate request and what is part of the DDoS attack. The web server 30 is unable to handle the requests and the DDoS attack is successful.

However, still referring to FIG. 4, the zombie 300 must make common network protocol stack calls and register to receive incoming packets with the network protocol 210 just like all other applications 200. This registering and receiving process is the zombie's Achilles heel. As will be discussed in further detail in reference to FIGS. 5 through 9, the ZADAR intermediate driver 400 is able to detect the abnormal flow of packets from a zombie 300 to and from web servers 30 to create an identifiable traffic signature. This identifiable traffic signature will allow the ZADAR intermediate driver 400 to detect the Zombie 300 as part of a larger DDoS attack. Since the ZADAR intermediate driver 400 operates below the network protocol 210 layer, the zombie 300 is unaware that its activity has been noticed. From this position the ZADAR intermediate driver 400 can monitor the flow of requests and packets of both sends and receives. Using this control, the ZADAR intermediate driver 400 monitors the flow on each packet as well as tracking the short term and long term trends. Since zombie traffic signature patterns are fairly defined, the ZADAR intermediate driver 400 is able to look for these traffic signature patterns. Therefore, rather than attempting to block a DDoS attack at the target point, web server 30, the ZADAR intermediate driver 400 is able to detect and restricts the DDoS attack at the source, server 20, PC 10, or Web server 30.

Figure 5:
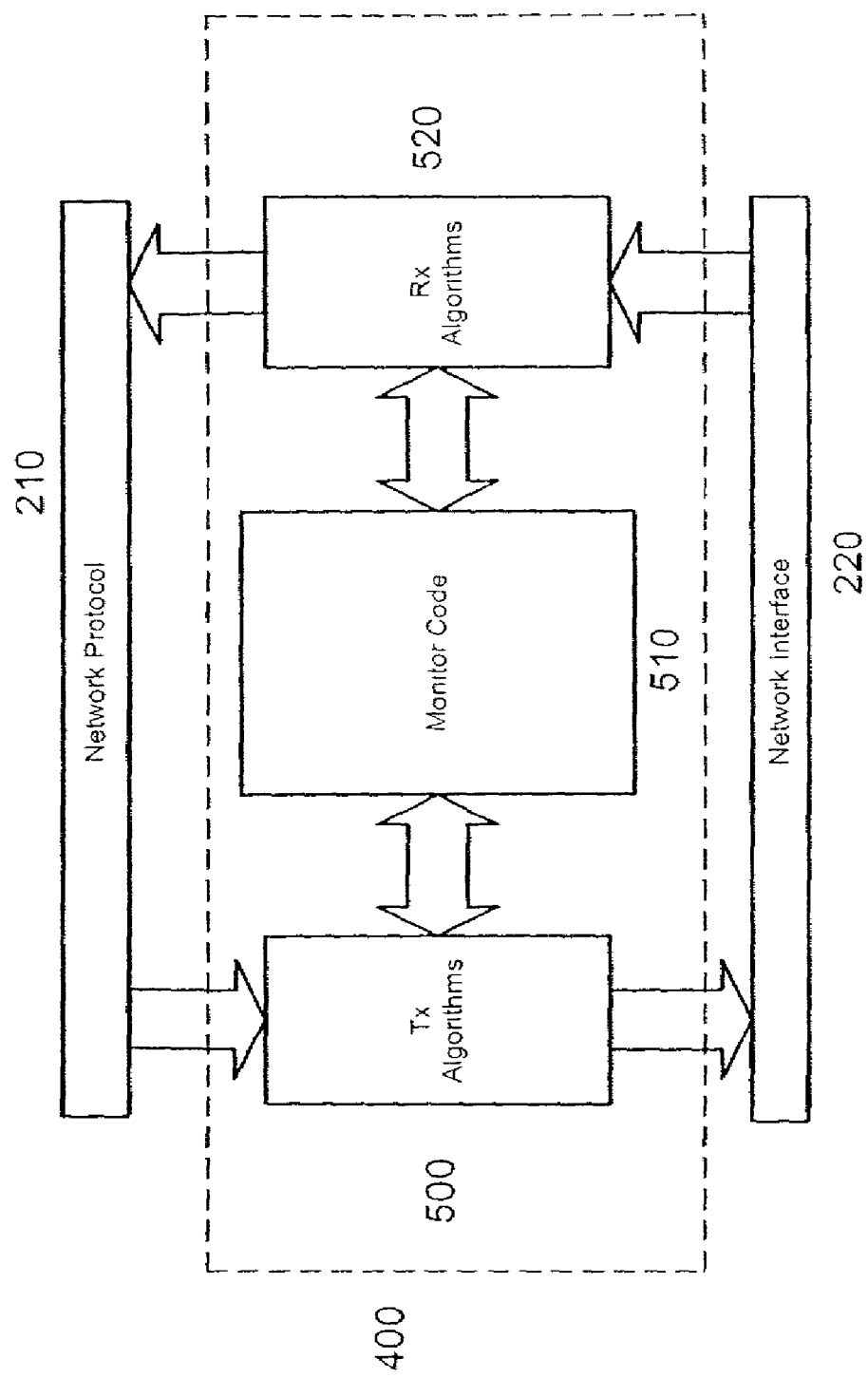
FIG. 5 is a modular configuration diagram of the ZADAR intermediate driver 400 utilized in an example embodiment of the present invention and further detailed in the flowcharts illustrated in FIGS. 6–9.

Before proceeding into a detailed discussion of the logic used by the embodiments of the present invention it should be mentioned that the flowcharts shown in FIGS. 6 through 9 as well as the modular configuration diagram shown in FIG. 5 contain software, firmware, hardware, processes operations that correspond, for example, to code, sections of code, instructions, commands, objects, hardware or the like, of a computer program that is embodied, for example, on a storage medium such as floppy disk, CD Rom, EP Rom, RAM, hard disk, etc. Further, the computer program can be written in any language such as, but not limited to, for example C++. In the discussion of the flowcharts in FIGS. 6 through 9, reference will be simultaneously made to the corresponding software modules shown in FIG. 5. It should further be noted that the logic illustrated in FIGS. 2 through 5 may execute on either server 20, web server 30 or personal computer 10.

FIG. 5 is a modular configuration diagram of the ZADAR intermediate driver 400 utilized in an example embodiment of the present invention and further detailed in the flowcharts illustrated in FIGs. 6 through 9. The ZADAR intermediate driver 400 comprises three major components. The first component is a transmit (TX) algorithm 500 used to monitor incoming packets. The Tx algorithm 500 is discussed in further detail in reference to FIGs. 6 and 9. The second major component is the receive (Rx) algorithm 520, which is discussed in further detail in reference to FIGS. 7 and 9. the third major components in the ZADAR intermediate driver 400 is the monitor code 510, which is discussed in further detail in FIG. 8. As shown in FIG. 5 the Tx algorithm 500 receives packets from the network protocol 210 and transmits them to the network interface 220. Further, the Rx algorithm 520 receives packets from the network interface 220 and transmits them to the network protocol 210. Both the Tx algorithm 500 and Rx algorithm 520 communicate to the monitor code 510. The monitor code 510 does not actively send or receive packets of information, but does monitor the activities of applications 200 and zombies 300 through information received from the Tx algorithm 500 and the Rx algorithm 520.

Figure 6:
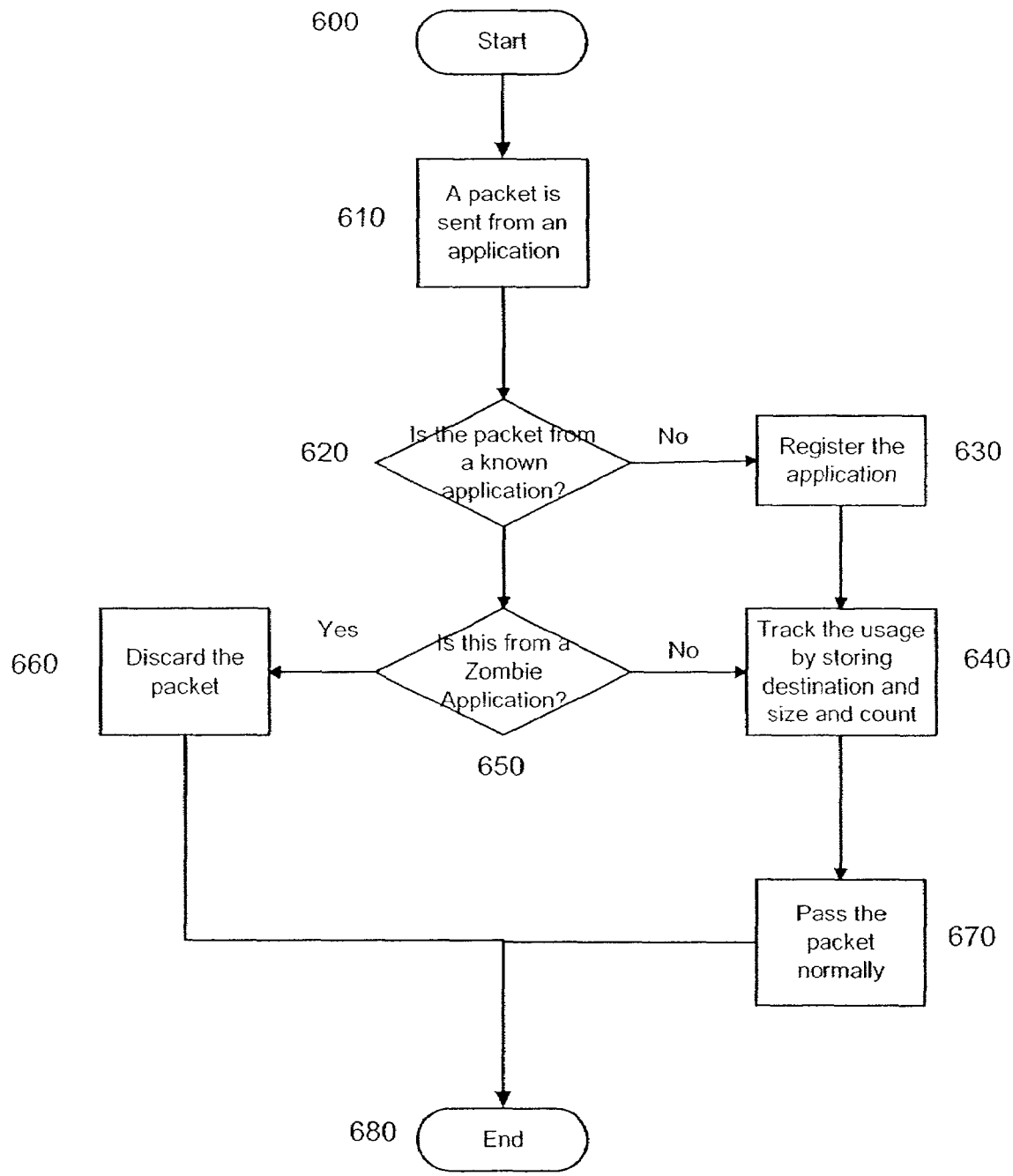
FIG. 6 is a flowchart illustrating the logic involved in the transmit (Tx) algorithm 500, illustrated in FIG. 5, in an example embodiment of the present invention.

FIG. 6 is a flowchart illustrating the logic involved in the transmit (Tx) algorithm 500, illustrated in FIG. 5, in an example embodiment of the present invention. The Tx algorithm 500 begins execution in operation of 600 and immediately proceeds to operation 610. In operation 610, a packet is received by the Tx algorithm from the network protocol 210 either from an application 200 or a zombie 300. Thereafter, in operation 620 it is determined if the packets are from a known application. Operation 620 is further detailed in the discussion provided in reference to FIG. 9. If the packet is determined in operation 620 to be from a known application 206, then processing proceeds to operation 630. In operation 630 the application is registered and processing proceeds to operation 640 where the usage of the network is tracked by storing the destination, packet size and packet count using the monitor code 510.

However, still referring to FIG. 6, if in operation 620 the application 200 sending the packet is not known, then processing proceeds to operation 650. In operation 650 it is determined if this particular packet is from a known zombie 300. If the packet is from a known zombie 300 then processing proceeds to operation 660 where the packet is discarded. Thereafter, processing proceeds to operation 680 where processing is terminated.

However, still referring to FIG. 6, if in operation 650 it is determined the packet is not from a known zombie 300, then processing proceeds to operation 640. In operation 640, as previously discussed, the network usage is stored based upon the destination address, packet size, and packet count using the monitor code 510. Thereafter, processing proceeds to operation 670 where the packet is passed to the network interface 220 for transmission. Then, processing proceeds to operation 680 where the Tx algorithm 500 terminates execution.

Figure 7:
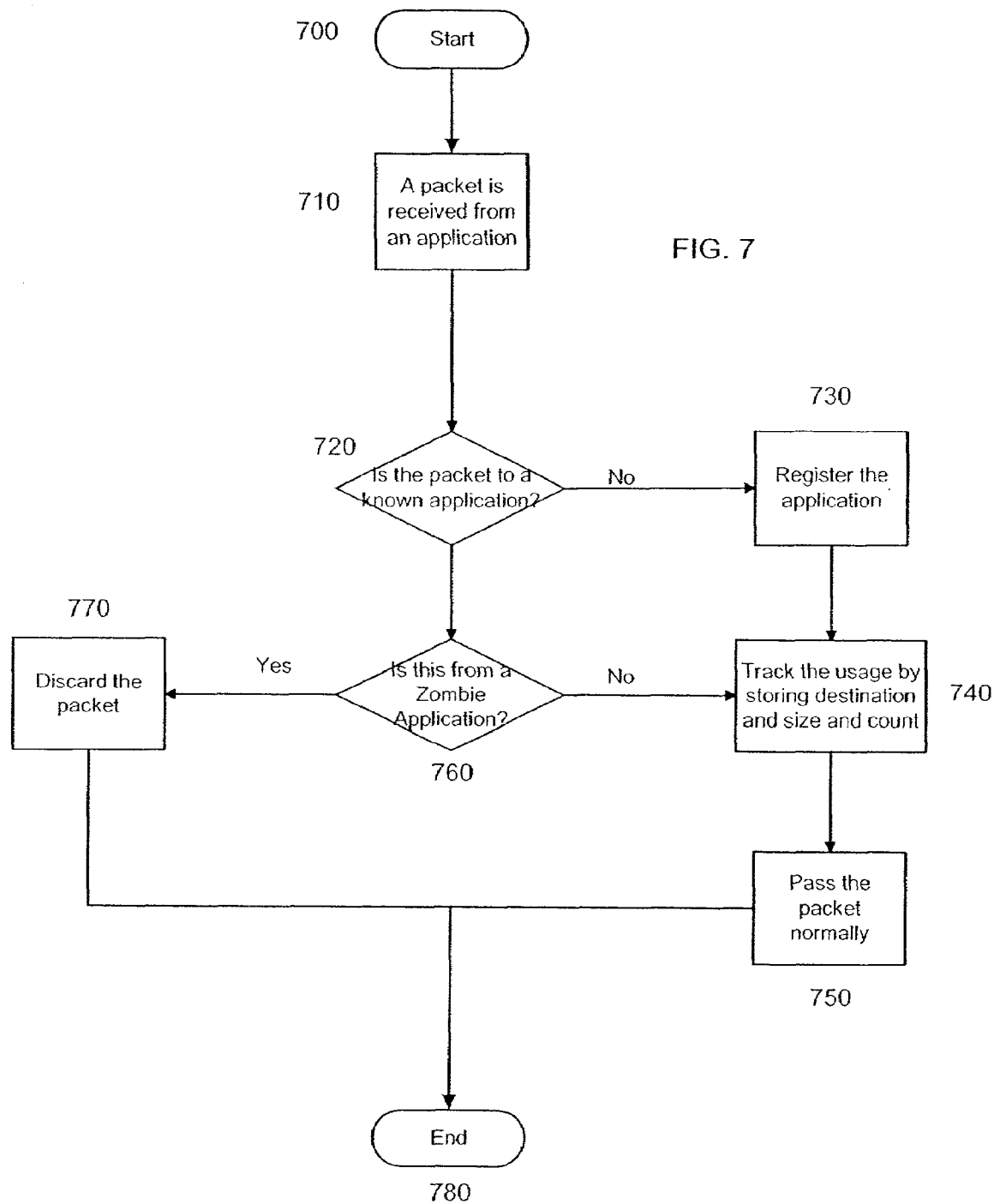
FIG. 7 is a flowchart illustrating the logic involved in the receive (Rx) algorithm 520, shown in FIG. 5, in an example embodiment of present invention.

FIG. 7 is a flowchart illustrating the logic involved in the receive (Rx) algorithm 520, shown in FIG. 5, in an example embodiment of present invention. The Rx algorithm 520 begins execution in operation 700 and immediately proceeds to operation 710. In operation 710, a packet is received by the Rx algorithm 520 from the network interface 220, either from an application 200 or a zombie 300. Thereafter, in operation 720, it is determined if the packet is from a known application. Operation 720 is further detailed in the discussion provided in reference to FIG, 9. If the packet is determined in operation 720 to be from a known application, then processing proceeds to operation 730. In operation 730, the application is registered and processing proceeds to operation 740 where the usage of the network is tracked by storing the destination, packet size and packet count using the monitor code 510.

However, still referring to FIG. 7, if in operation 720 the application 200 sending the packet is not known, then processing proceeds to operation 760. In operation 760 it is determined if this particular packet is from a known zombie 300. If the packet is from a known zombie 300 then processing proceeds to operation 770 where the packet is discarded. Thereafter, processing proceeds to operation 780 where processing is terminated.

However, still referring to FIG. 7, if in operation 760 it is determined the packet is not from a known zombie 300, then processing proceeds to operation 740. In operation 740, as previously discussed, the network usage is stored based upon the destination address, packet size, and packet count using the monitor code 510. Thereafter, processing proceeds to operation 750 where the packet is passed to the network protocol 210 for transmission to the desired application 200. Thereafter, processing proceeds to operation 780 where the Rx algorithm 520 terminates execution.

Figure 8:
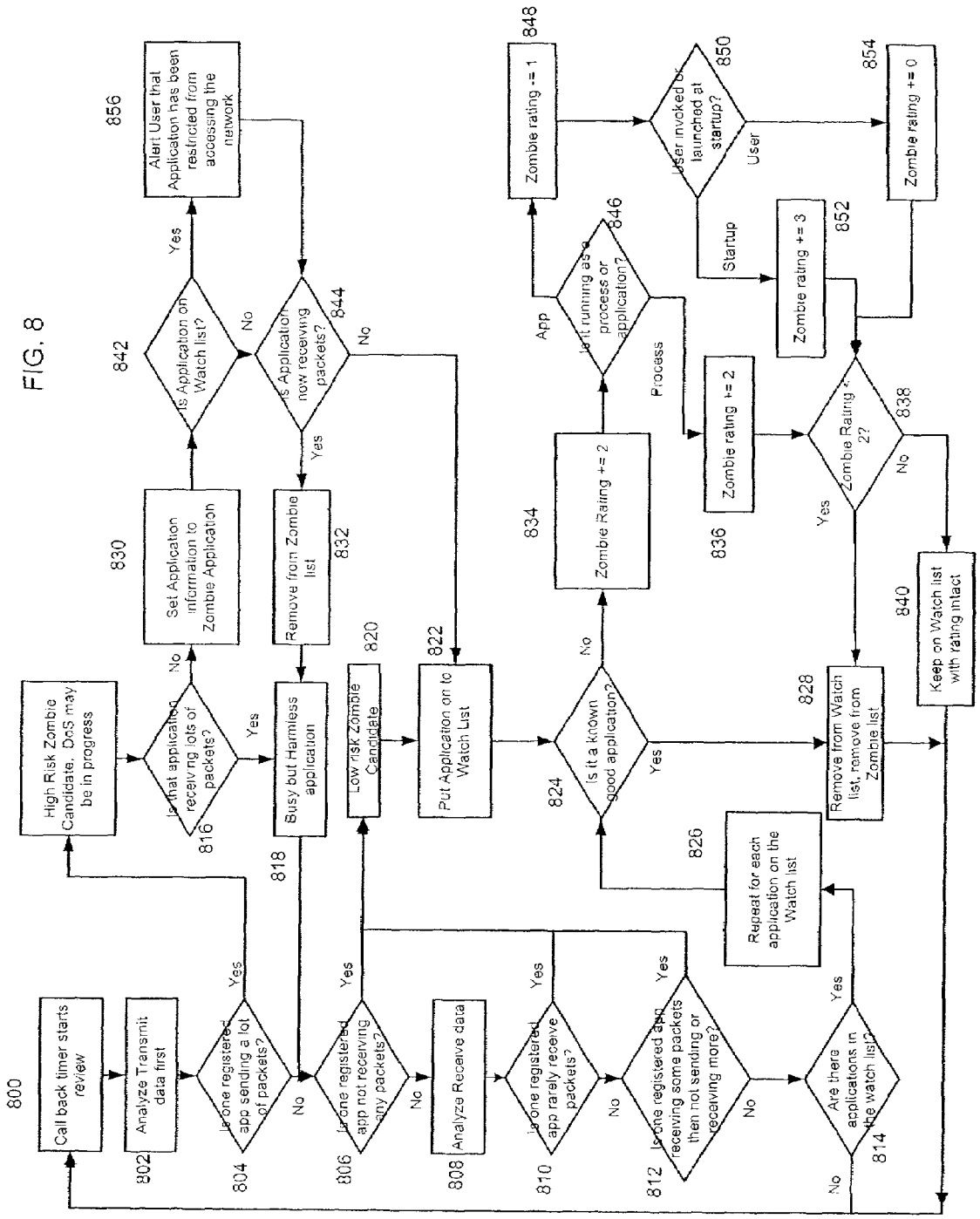
FIG. 8 is a flowchart illustrating the logic involved in the monitor code 510, illustrated in FIG. 5, in an example embodiment of the present invention.

FIG. 8 is a flowchart illustrating the logic involved in the monitor code 510, illustrated in FIG. 5, in an example embodiment of the present invention. The monitor code 510 begins execution in operation 800 based upon a callback timer which periodically causes the execution of the monitor code 510. The frequency of execution of the monitor code 510 may be adjusted dependent upon the traffic load experienced by the server 20, PC 10, or web server 30. In operation 802, data received from the Tx algorithm 500 is first analyzed since if the packets received are from a zombie then potential harm might occur to the receiving system and it would be desirable to block this activity as quickly as possible. Thereafter, in operation 804, it is determined whether a registered application 200 (or possible zombie 300) is transmitting a large number of packets. Such a transmission of a large number of packets would cause the application 200 to be considered a possible zombie 300. If in operation 804 it is determined that the application 200 is not transmitting a large number of packets then processing proceeds to operation 806. In operation 806, it is determined if the registered application 200 is not receiving any packets. If the application 200 is receiving packets then processing proceeds to operation 808 where data received from the Rx algorithm 520 is analyzed. Then in operation 810 it is determined whether application 200 (or possible zombie 300) is rarely receiving any packets. If in operation 810 it is determined that the application 200 is not rarely receiving packets, then processing proceeds to operation 812. In operation 812, it is determined if the application 200 was receiving packets and is no longer receiving or sending packets. If the application 200 is determined to be still receiving packets which are not an inordinate amount of packets, then processing proceeds to operation 814. In operation 814 it is determined if the application 200 has been placed on a watch list. This watch list serves to identify applications 200 which may be zombie's 300 and require further monitoring. If in operation 814 it is determined that the application 200 is not listed in the watch list then processing loops back to operation 800.

Still referring to FIG. 8, if in operation 804 it is determined that an application 200 is transmitting a large number of packets then processing proceeds to operation 816 where the application 200 is considered to be a high-risk of being a zombie 300 and that a possible DDoS attack is in progress. Thereafter, in operation 816 it is determined whether the application 200 is also receiving a large number of packets. If the application 200 is receiving a large number of packets then processing proceeds to operation 818 where it is determined that the application 200 is simply exchanging large amounts of data and therefore is a harmless application 200. Thereafter, processing proceeds to operation 806 as previously discussed. However, if in operation 816 the application 200 is not receiving a large number of packets then processing proceeds to operation 830. In operation 830 the application 200 is identified as a zombie 300 and processing proceeds to operation 842. In operation 842 it is determined if the application 200 has previously been placed on the previously discussed watch list. If the application has been previously placed on the watch list, then processing proceeds to operation 856 where the user is notified that the application 200 is a zombie application and is restricted from further accessing the network 40. Thereafter, processing proceeds to operation 844 where it is determined if the application is now receiving packets. If the application 200 is now receiving packets then processing proceeds to operation 832 where the application 200 is removed from the zombie list and thereafter processing proceeds to operation 818 as previously discussed. Operation 844 serves the function of identifying ordinary applications 200 which have transmitted large amounts of data but have not received any due to a slow response from another piece of equipment in network 40.

Still referring to FIG. 8, if however in operation 844 the application 200 has not yet received any incoming packets then processing proceeds to operation 822. In operation 822, the application 200 is placed upon a watch list and processing proceeds to operation 824. In operation 824, it is determined whether the application 200 is a known good application. A list of known good applications may be specified by the user or systems administrator. If the application 200 is known to be a good application then processing proceeds to operation 828 where the application is removed from the watch list and zombie list. Thereafter, processing proceeds from operation 828 back to operation 800.

Still referring to FIG. 8, if the application 200 is determined in operation 824 not to be a known good application then processing proceeds to operation 834. Operations 834 through 838 and 846 through 854 attempt to rate the probability that a particular application 200 is considered to be a zombie 300. A numerical rating system is used where a rating of 2 or greater is considered suspect and the application 200 is kept on the watch list until the next cycle through the monitor code 510. In operation 834, the zombie rating for this particular application 200 is incremented by a value of 2. As would be appreciated by one of ordinary skill in the art the rating values supplied in operations 834 through 838 and 846 through 854 may vary based on testing or the judgment of the systems administrator. Thereafter, processing proceeds from operation 834 to operation 846 where it is determined whether the application 200 is executing as a process or an application. Typically, applications are easily noticed by users since they normally entail the opening of a window or some other indications that they are active. However, processes normally operate in the background and a user may not necessarily be aware of their execution.

Still referring to FIG. 8, if in operation 846 it is determined that the application 200 is a software application, then processing proceeds to operation 848 where the associated zombie rating for the application 200 is decremented by a value of one. Thereafter, processing proceeds to operation 850 where it is determined if the application 200 was launched by the user or at startup. If the application was launched by the user then it cannot be assumed not to be a zombie 300. Therefore, in operation 854 the associated zombie rating for the application 200 is incremented by a value of zero and processing proceeds to operation 838. However, in operation 850, if it is determined that the application 200 was initiated at startup then processing proceeds to operation 852 where the associated zombie rating is incremented by value of 3. Since viruses such a zombies are often placed in the startup list to be executed upon systems startup, incrementing the zombie rating by a high value is warranted. Either from operation 854 or operation 852 processing then proceeds to operation 838 where it is determined if the associated zombie rating for the application 200 is greater than a value of 2. If the zombie rating is less than a value of 2 then processing proceeds to operation 828, as previously discussed, where the application 200 is removed from the watch list and the zombie list. However, if the zombie rating is greater than a value of 2 then processing proceeds to operation 840 where the application is kept on the watch list with its current zombie rating value kept intact. Thereafter, from operation 840, processing loops back to operation 800.

Still referring to FIG. 8, returning to operation 806, if an application 200 is not receiving any packets then processing proceeds to operation 820 where it is considered to be a low risk for a candidate as a zombie 300. Processing also proceeds from operation 810 to 820 if the application 200 is rarely receiving any packets. Also, processing proceeds from operation 812 to operation 820 when a particular application 200 is no longer receiving or sending any packets after receiving a few packets. In any of the foregoing situations the application 200 is considered a low risk candidate as a zombie 300 in operation 820 and as previously discussed processing proceeds to operation 822.

Figure 9:
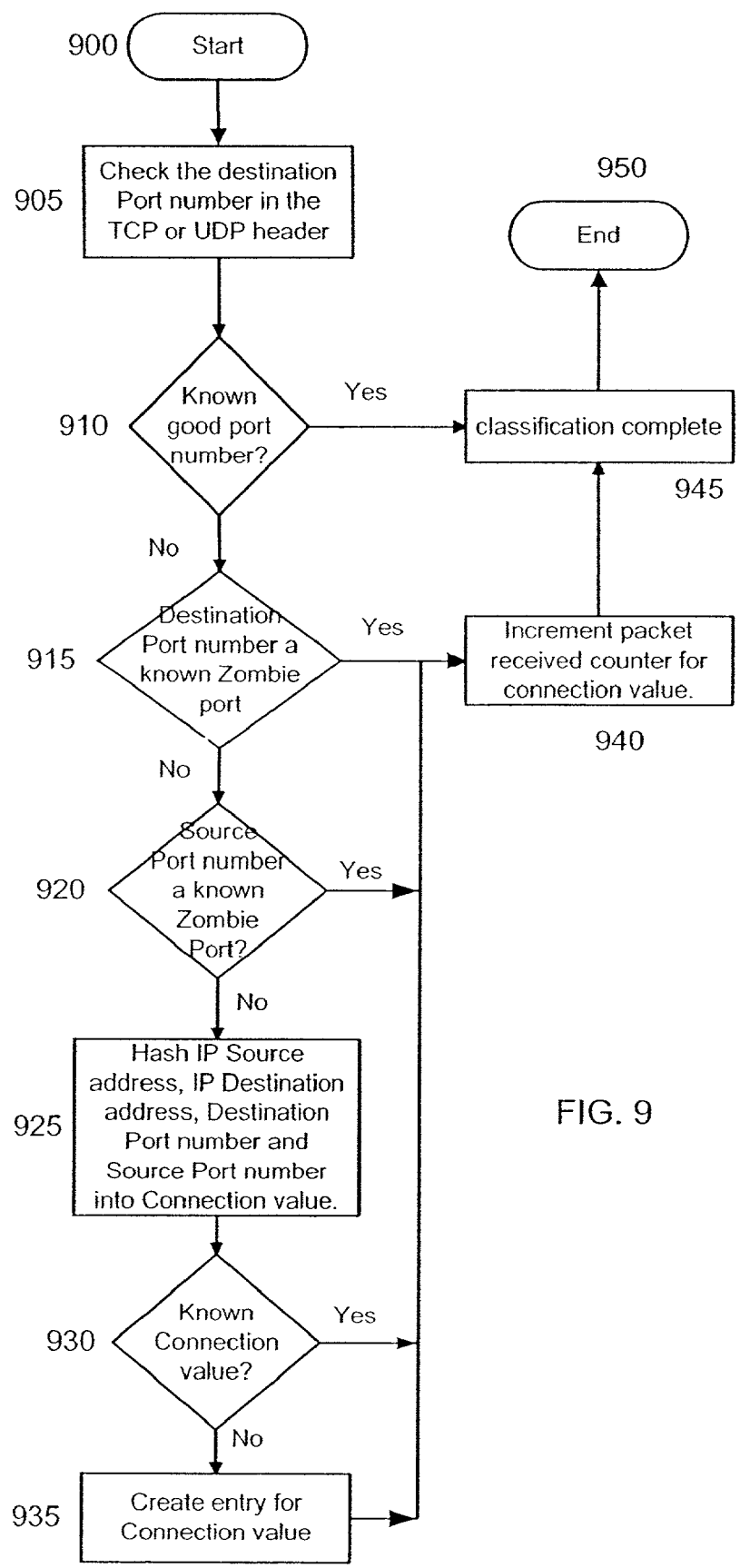
FIG. 9 is a flowchart further detailing the logic involved in operations 620 and 650, illustrated in FIG. 6, and 720 and 750, illustrated in FIG. 7, in an example embodiment of the present invention.

FIG. 9 is a flowchart further detailing the logic involved in operations 620 and 650 illustrated in FIG. 6 and 720 and 750 illustrated in FIG. 7, in an example embodiment of the present invention. The logic involved in FIG. 9 attempts to determine whether a particular application is a known good application 200 or a zombie 300 based upon thedestination port specified. Execution begins in operation 900 and immediately proceeds to operation 905 where the destination port number provided by the TCP/IP or UDP header is checked. Thereafter, in operation 910 it is determined whether the particular destination port is from a known good port. If the port number is known to be a good port then processing proceeds to operation 945 where the classification process is completed and processing terminates in operation 950.

Still referring to FIG. 9, if it is determined that the port number from the TCP/IP or UDP header is not a known good-port then processing proceeds to operation 915. In operation 915, it is determined whether the port number in question is a known zombie port. If the port number is known to be from a zombie port then processing proceeds to operation 940 where packets received counter is incremented for the connection value and processing proceeds, as previously discussed, to operation 945. However, if in operation 915 the port number is not a known zombie port then processing proceeds to operation 920. In operation 920 it is determined whether the source port number from the TCP/IP or UDP header is a known zombie port. If the source port number is from a known zombie port then again processing proceeds to operation 940. However, if the source port number is not known to be a zombie port then processing proceeds to operation 925. In operation 925 the IP address, IP destination address, destination port number, and source port number are hashed to form a singe connection value. This single connection value will serve as a unique identifier for this particular application 200. Thereafter, processing proceeds to operation 930 where the connection value computed in operation 925 is checked against a list to determine if it is present. If the connection value is not present in the list then processing proceeds to operation 935 where it is added to the list and again processing ten proceeds to operation 940.

The benefit resulting from the present invention is that a simple, reliable system, method and computer program is provided for detecting and restricting network activities of software engaged in distributed denial of service attacks. Utilizing the present invention it is possible to block a DDoS attacks at the source rather than at the target server.

While we have shown and described only a few examples herein, it is understood that numerous changes and modifications as known to those skilled in the art could be made to the example embodiment of the present invention. Therefore, we do not wish to be limited to the details shown and described herein, but intend to cover all such changes and modifications as are encompassed by the scope of the appended claims.

I claim:

1. A system for detecting and restricting denial of service attacks, comprising:
   a computer having application software in communication with a network protocol, the computer comprising a network interface and a zombie detection driver coupled between, and in communication with, the network protocol and the network interface, the zombie detection driver comprising:
      a transmit module to receive outgoing packets from a software application and to discard the outgoing packets that are determined to be from a zombie application prior to being transmitted over a network;
      a receive module to receive incoming packets from a network interface and to discard the incoming packets that are determined to be from a zombie application; and
      a monitor module in communications with the transmit module and the receive module to track transmit packet patterns from and receive packet patterns to the software application and to determine whether the software application is the zombie application based upon the transmit and receive packet patterns.

2. The system recited in claim 1, wherein the monitor module determines that the software application is the zombie application by identifying that the software application is transmitting a large number of packets without receiving any packets and placing the software application on a zombie list or a watch list.

3. The system recited in claim 2, wherein the monitor module alerts the user and the transmit module and the receive module that the software application is the zombie application when the software application has previously been placed on the zombie list or the watch list and the software application is still transmitting a large number of packets without receiving any packets.

4. The system recited in claim 1, wherein the monitor module determines that the software application is a possible zombie application by identifying that the software application is not receiving any packets and placing the software application on a watch list.

5. The system recited in claim 4, wherein the monitor module alerts the user and the transmit module and the receive module that the software application is the zombie application when the software application has previously been placed on the watch list and the software application is now transmitting a large number of packets.

6. The system recited in claim 1, wherein the monitor module determines that the software application is a possible zombie application by identifying that the software application is rarely receiving any packets and placing the software application on a watch list.

7. The system recited in claim 6, wherein the monitor module alerts the user and the transmit module and the receive module that the software application is the zombie application when the software application has previously been placed on the watch list and the software application is now transmitting a large number of packets.

8. The system recited in claim 1, wherein the monitor module determines that the software application is a possible zombie application by identifying that the software application, after having received some packets, has stopped sending packets or receiving more packets and placing the software application on a watch list.

9. The system recited in claim 8, wherein the monitor module alerts the user and the transmit module and the receive module that the software application is the zombie application when the software application has previously been placed on the watch list and the software application is now transmitting a large number of packets.

10. A system for detecting and restricting denial of service attacks, comprising:
    a transmit module to receive packets from a software application and discard packets that are determined to be from a zombie application;
    a receive module to receive packets from a network interface and discard packets that are determined to be from a zombie application; and
    a monitor module in communications with the transmit module and the receive module to track packet transmission and reception patterns to and from the software application and to determine whether the software application is a zombie application based on the packet transmission and reception patterns, wherein the monitor module to identify the software application as a zombie application when the software application is transmitting a large number of packets without receiving any packets and to place the software application on a zombie list or a watch list, wherein the monitor module will retain the software application on the watch list when a zombie rating for the software application exceeds a predetermined value, the zombie rating being based on whether the software application is an application or a process and whether the software application is user initiated or initiated at system startup.

11. A system for detecting and restricting denial of service attacks, comprising:
    a transmit module to receive packets from a software application and discard packets that are determined to be from a zombie application;
    a receive module to receive packets from a network interface and discard packets that are determined to be from a zombie application; and
    a monitor code in communications with the transmit module and the receive module to track packet transmission and reception patterns to and from the software application and determine whether the software application is a zombie application based upon the packet transmission and reception pattern, the monitor module to identify the software application as the zombie application when the software application is not receiving any packets and to place the software application on a watch list, wherein the monitor module will retain the software application on the watch list when a zombie rating for the software application exceeds a predetermined value, the zombie rating being based on whether the software application is an application or a process and whether the software application is user initiated or initiated at system startup.

12. A system for detecting and restricting denial of service attacks, comprising:
    a transmit module to receive packets from a software application and discard packets that are determined to be from a zombie application;
    a receive module to receive packets from a network interface and discard packets that are determined to be from a zombie application; and
    a monitor module in communications with the transmit module and the receive module to track packet transmission and reception patterns to and from the software application and to determine whether the software application is a zombie application based on the packet transmission and reception patterns, the monitor module to identify the software application as a possible zombie application when the software application is rarely receiving any packets and to place the software application on a watch list, wherein the monitor module will retain the software application on the watch list when a zombie rating for the software application exceeds a predetermined value, the zombie rating being based on whether the software application is an application or a process and whether the software application is user initiated or initiated at system startup.

13. A system for detecting and restricting denial of service attacks, comprising:

a transmit module to receive packets from a software application and discard packets that are determined to be from a zombie application;

a receive module to receive packets from a network interface and discard packets that are determined to be from a zombie application; and a monitor module in communications with the transmit module and the receive module to track packet transmission and reception patterns to and from the software application and to determine whether the software application is a zombie application based on the packet transmission and reception patterns, the monitor module to identify the software application as a possible zombie application when the software application, after having received some packets, has stopped sending packets or receiving more packets and to place the software application on a watch list, wherein the monitor module will retain the software application on the watch list when a zombie rating for the software application exceeds a predetermined value, the zombie rating being based on whether the software application is an application or a process and whether the software application is user initiated or initiated at system startup.

14. A method of detecting and restricting denial of service attacks, comprising:

monitoring incoming and outgoing packets to and from a software application;

placing the software application on a zombie list or a watch list when a pattern of the incoming or outgoing packets to or from the software application matches that of the characteristics of a zombie application;

determining whether the software application is a known good application, wherein if the software application is not a known good application, then applying a zombie rating to the software application, wherein the zombie rating is based on the factors of whether the software application is an application or a process and whether the software application is user initiated or initiated at system startup, and if the software application is a known good application, then removing the software application from the watch list and/or zombie list; and blocking reception and transmission of packets to and from the software application when the software application has been placed on the watch list or the zombie list in a previous cycle and the software application further exhibits the characteristics of a zombie application.

15. The method recited in claim 14, wherein the characteristics of a zombie application are transmitting a large number of packets while receiving no incoming packets.

16. The method recited in claim 14, wherein the characteristics of a zombie application are receiving no incoming packets and having a zombie rating exceeding a predetermined value.

17. The method recited in claim 14, wherein the characteristics of a zombie application are rarely receiving incoming packets and having a zombie rating exceeding a predetermined value.

18. The method recited in claim 14, wherein the characteristics of a zombie application are receiving incoming packets at first and then not receiving or sending any packets and having a zombie rating exceeding a predetermined value.

19. An article comprising a machine-accessible medium having stored thereon a plurality of instructions that, when executed by the machine, cause the machine to:

monitor incoming and outgoing packets to and from a software application;

place the software application on a zombie list or a watch list when a pattern of the incoming or outgoing packets to or from the software application matches that of the characteristics of a zombie application;

determine whether the software application is a known good application, wherein if the software application is not a known good application, then apply a zombie rating to the software application, wherein the zombie rating is based on the factors of whether the software application is an application or a process and whether the software application is user initiated or initiated at system startup, and if the software application is a known good application, then remove the software application from the watch list and/or zombie list and block reception and transmission of packets to and from the software application when the software application has been placed on the watch list or the zombie list in a previous cycle and the software application further exhibits the characteristics of a zombie application.

20. The article recited in claim 19, wherein the characteristics of a zombie application are transmitting a large number of packets while receiving no incoming packets.

21. The article recited in claim 19, wherein the characteristics of a zombie application are receiving no incoming packets and having a zombie rating exceeding a predetermined value.

22. The article recited in claim 19, wherein the characteristics of a zombie application are rarely receiving incoming packets and having a zombie rating exceeding a predetermined value.

23. The article recited in claim 19, wherein the characteristics of a zombie application are receiving incoming packets at first and then not receiving or sending any packets and having a zombie rating exceeding a predetermined value.

24. The system of claim 1, wherein the incoming packets determined to be from the zombie application include request packets comprising target device information and a start sequence to enable the zombie application to begin executing, wherein the receive module discards the request packets before the request packets are allowed to enter a network protocol module.

25. The system of claim 1, wherein the receive module blocks the zombie applications from registering for network access via a network protocol module.

26. The system of claim 10, wherein the monitor module to alert the user, the transmit module, and the receive module that the software application is the zombie application when the software application has previously been placed on the zombie list or the watch list and the software application is still transmitting a large number of packets without receiving any packets.

27. The system of claim 11, wherein the monitor module to alert the user, the transmit module, and the receive module that the software application is the zombie application when the software application has previously been placed on the watch list and the software application is now transmitting a large number of packets.

28. The system of claim 12, wherein the monitor module to alert the user, the transmit module, and the receive module that the software application is the zombie application when the software application has previously been placed on the watch list and the software application is now transmitting a large number of packets.

29. The system of claim 13, wherein the monitor module to alert the user, the transmit module, and the receive module that the software application is the zombie application when the software application has previously been placed on the watch list and the software application is now transmitting a large number of packets.

30. A method of detecting and restricting denial of service attacks, comprising:

monitoring incoming and outgoing packets to and from a software application;

placing the software application on a zombie list or a watch list when a pattern of the incoming or outgoing packets from the software application matches characteristics of a zombie application;

providing a zombie rating to the software application, wherein the zombie rating is based on whether the software application is an application or a process and whether the application is user initiated or initiated at system startup; and blocking reception and transmission of packets to the software application when the software application has been placed on the watch list or the zombie list in a previous cycle and the software application further exhibits the characteristics of a zombie application.

31. The method of claim 30, wherein the software application is maintained on the watch list and/or the zombie list when the zombie rating exceeds a predetermined value.

\* \* \* \* \*